INVENTOR.
NORMAN W. FOWLER
BY Richard W. Treverton
ATTORNEY

Nov. 28, 1967   N. W. FOWLER   3,354,783
GEAR MACHINE OR THE LIKE
Original Filed May 4, 1964   5 Sheets-Sheet 2

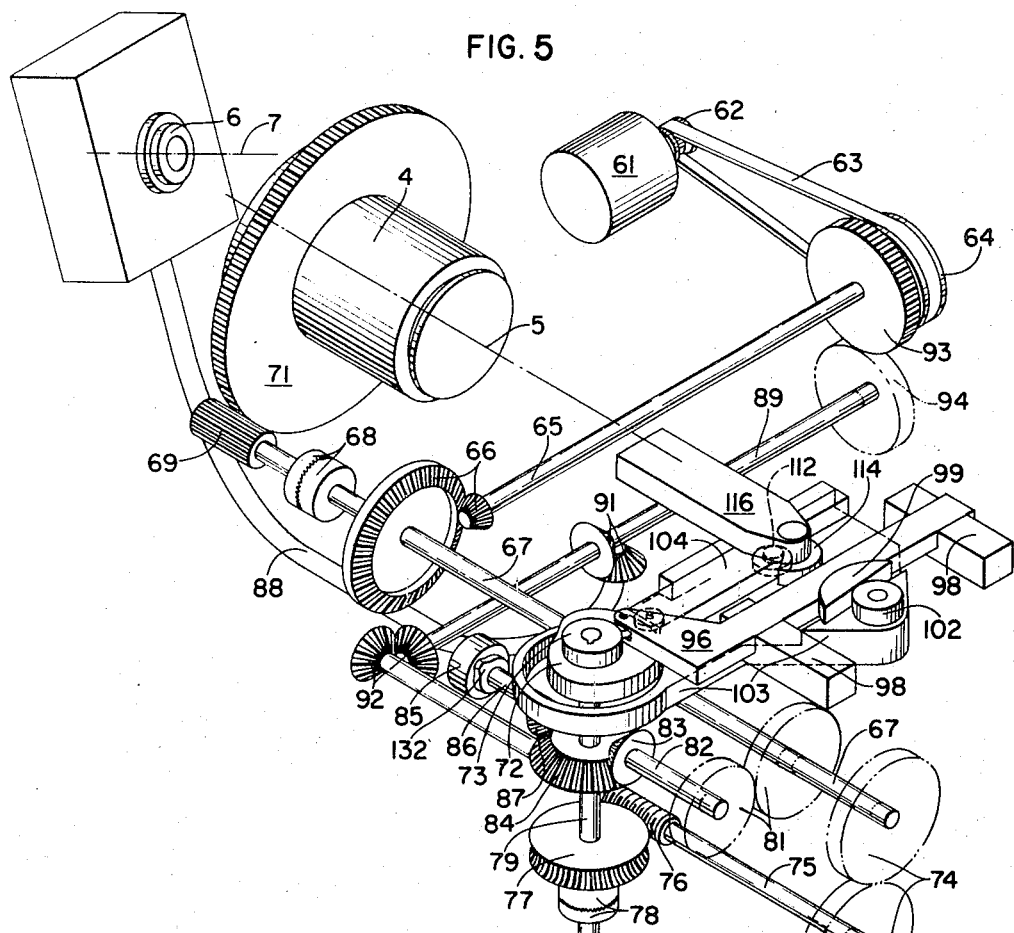
FIG. 5
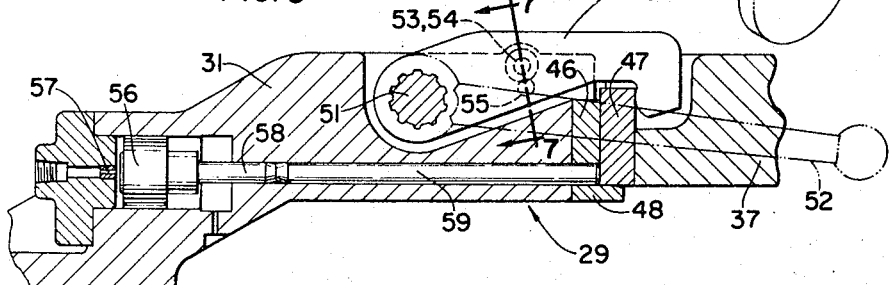
FIG. 6
FIG. 7

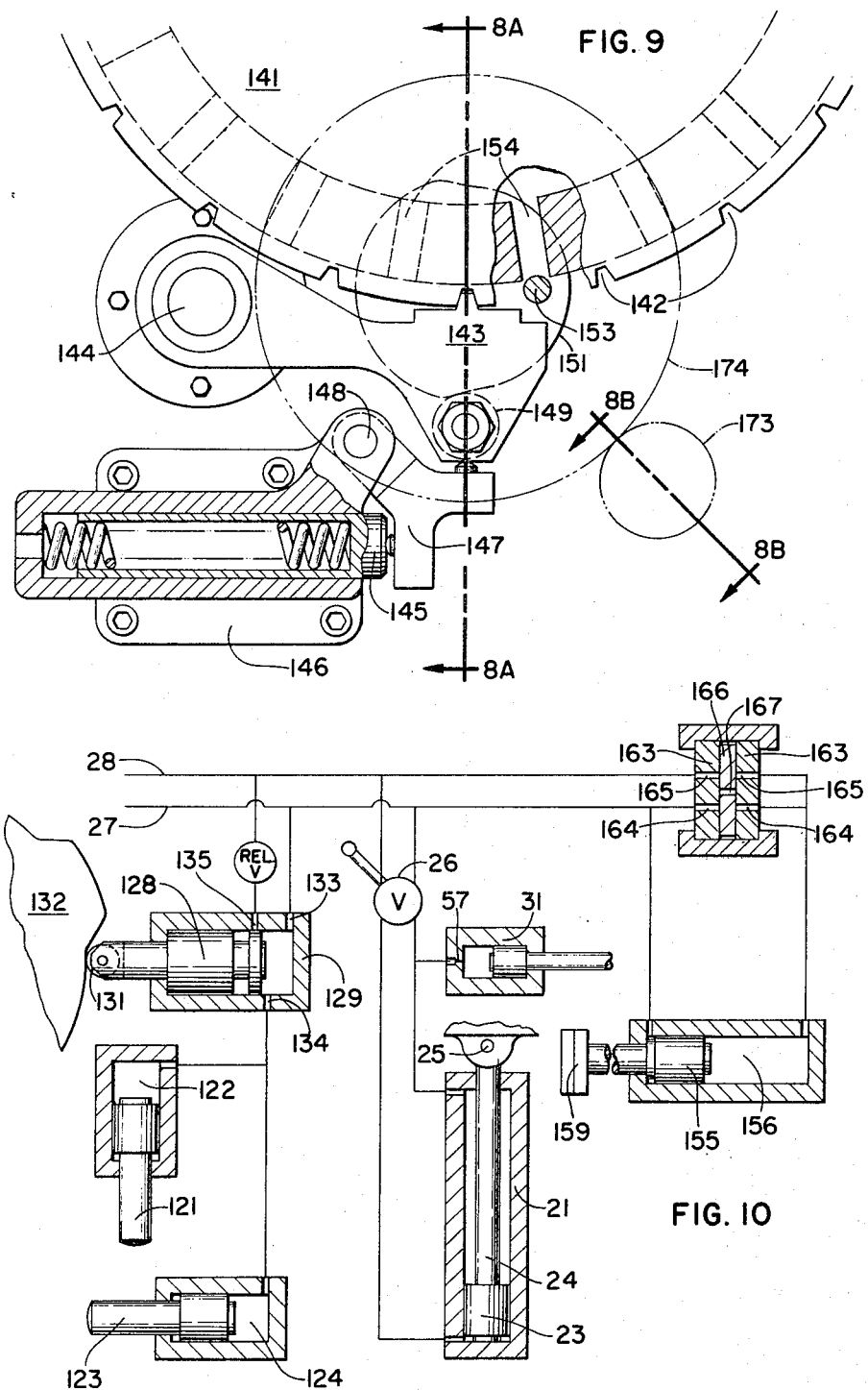

United States Patent Office 3,354,783
Patented Nov. 28, 1967

3,354,783
GEAR MACHINE OR THE LIKE
Norman W. Fowler, Rochester, N.Y., assignor to The Gleason Works, Rochester, N.Y., a corporation of New York
Original application May 4, 1964, Ser. No. 364,483, now Patent No. 3,269,270, dated Aug. 30, 1966. Divided and this application Jan. 28, 1966, Ser. No. 532,043
13 Claims. (Cl. 90—9.4)

ABSTRACT OF THE DISCLOSURE

The cutter spindle of this gear cutting machine is reciprocated axially, as it rotates, by a pair of co-rotatable cams which are gear driven in time with the spindle. The cams actuate slides disposed at substantially right angles to the spindle and transmit motion to the spindle through inclined guides and follower rollers, the inclination of the guides being adjustable to vary the magnitudes of the transmitted reciprocating motions. The mechanism is so arranged that the motion produced by one cam is added to that produced by the other cam. The work spindle of the machine and a Geneva mechanism for intermittently indexing it are contained in a housing that is adjustable relative to the housing for the cutter spindle and the cutter spindle drive, and is operated by this drive through a flexible shaft. The drive member of the Geneva mechanism is driven through reduction gearing from a higher speed shaft which carries a flywheel and is driven by the flexible shaft.

---

The present invention is a division of my application Ser. No. 364,483, filed May 4, 1964 and now Patent No. 3,269,270, and relates to a machine for cutting gears or the like, especially non-generated spiral bevel and hypoid gears having tooth surfaces which are either helicoids or modified surfaces of revolution, by the methods disclosed in Patent No. 3,110,225, to L. O. Carlsen et al.

The primary object of the present invention is to improve and simplify the mechanism of prior machines of this type.

The foregoing and other objects and advantages will appear from the following description of the preferred embodiment of the invention shown in the accompanying drawings, wherein:

FIG. 5 is an isometric view of the machine drive;

FIG. 6 is a sectional view of the overhead brace shown in FIGS. 1 and 2;

FIG. 7 is a detail sectional view in plane 7—7 of FIG. 6;

FIG. 9 is a sectional view in plane 9—9 of FIG. 8; and,

FIG. 10 is a hydraulic diagram.

Figure 1:
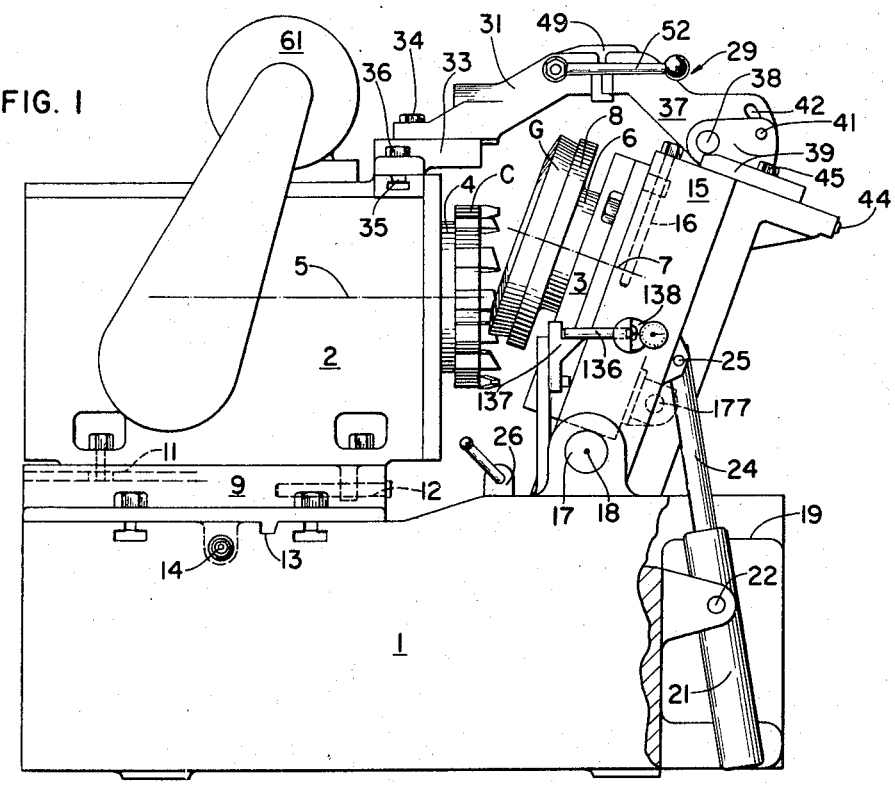
FIGS. 1 and 2 are respectively side and plan views of the machine.
Figure 2:
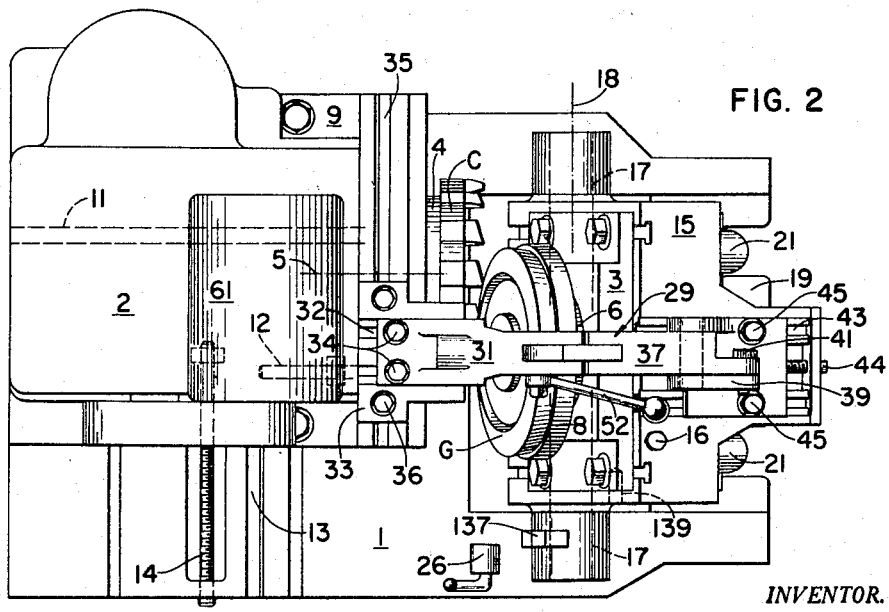

Referring to FIGS. 1 and 2 the machine comprises a frame 1 supporting a cutter spindle housing 2 and a work head 3. A spindle 4 for cutter C is journaled for rotation and reciprocation around and along horizontal axis 5. The work head journals a work spindle 6 for indexing rotation about axis 7, which is disposed in a vertical plane parallel to axis 5, the work spindle having secured thereon a work holder 8 for a work gear G in which tooth slots are to be cut by cutter C. Housing 2 is mounted on a plate 9 for horizontal adjustment thereon along a guide way 11 parallel to axis 5, such adjustment being made by means of a screw 12. Plate 9 is adjustable horizontally along a guide way 13 on the frame 1, perpendicular to axis 5, by means of an adjusting screw 14. After such adjustment the housing and plate are clamped together and to the frame by the T-bolts shown.

Work head 3 is mounted on a swinging base 15 for adjustment thereon in a vertical plane, and perpendicularly to work spindle axis 7, by means of an adjusting screw 16. The swinging base is pivoted by trunnions 17 for motion about horizontal axis 18 to advance and withdraw the work head relative to the cutter C. Axis 18 is perpendicular to axis 7 and is spaced below the latter in the advanced or cutting position of the work head shown in FIG. 1, so that the withdrawal motion of the work head is in an arcuate path downwardly away from the cutter. The terminal position of withdrawal is determined by abutment of the swinging base with a bolster part 19 of the frame 1. In this terminal position the work spindle axis 7 is vertical, to facilitate loading and unloading of work gears G. The advance and withdrawal are effected by a pair of hydraulic piston-cylinder units, one of which appears also in FIG. 10. Each unit comprises a cylinder 21 pivoted at 22 to frame 1 and a piston 23 whose rod 24 is pivoted at 25 to the swinging base. Application of pressure to cylinder 21 is controlled by a manually operated reversing and cut-off valve 26 connected to hydraulic pressure and return lines 27 and 28, as shown in FIG. 10.

Advance of the swinging base 15 is limited by the abutment of separable parts of an overhead brace 29 which extends between the upper portions of housing 2 and swinging base 15, above the work gear. One of these parts of the brace, designated 31, is adjustable horizontally along ways 32 on a plate 33, parallel to cutter axis 5, and is secured to the plate by T-bolts 34. The plate is adjustable horizontally along way 35 on housing 2, perpendicularly to axis 5, and is secured to the housing by T-bolts 36. Another part of the brace, 37, is pivoted by a pin 38 to a bracket 39 and is secured to the latter by a screw 41 which extends through an arcuate slot 42 in the part 37. The bracket is slidably adjustable, along ways 43 on swinging base 15 parallel to work spindle axis 7, by means of an adjusting screw 44, and is secured by screws 45.

Referring particularly to FIG. 6, hardened steel abutment blocks 46 and 47 are rigidly secured respectively to brace parts 31 and 37, block 46 having a lip 48 underlying block 47. A hook-shaped clamp 49 is affixed to a shaft 51 rotatable in part 31 and is engageable with the block 47 to secure parts 31 and 37 together. The blocks 46, 47 are trimmed to such thickness that the hook, when applied as shown in FIG. 6, clamps them tightly together. A handle 52 secured to the shaft 51 enables manual rotation to apply or release the hook. A spring-backed plunger 53, FIGS. 6 and 7, slidable in brace part 31, is engageable in detent recesses 54 and 55 in clamp 49 to respectively maintain the latter in its applied position and in an elevated release position in which the clamp is sufficiently clear of block 47 to allow withdrawal of the swinging base 15.

For checking the terminal advance of the swinging base, as the block 47 closely approaches block 46, the hydraulic dash-pot means shown in FIGS. 6 and 10 are provided. They comprise piston 56 slidable in a cylinder chamber in brace part 31 which has a restricted port 57 so connected with the hydraulic system as to be connected to exhaust when cylinder 21 is advancing the swinging base 15, and to be connected to pressure when the swinging base is being withdrawn. The piston rod, 58, abuts a rod 59 which is slidable in brace part 31 and is adapted for abutment by block 47.

In setting the swinging base 15 to a desired pre-calculated position, clamp 49 is released, screws 34, 41 and 45 are loosened, and by operation of valve lever 26 pressure is applied to cylinders 21 to inch the swinging base into approximately the desired position. To facilitate this operation a gage bar 136 of calculated length is positioned as shown in FIG. 1 on an adjustable-height gage bar holder 137 located on frame 1, and an indicator gage 138 adapted to contact the bar is mounted in a locating bore 139 in the swinging base. The clamp 49 may then be applied, the brace adjusted on plate 33 to cause bracket 39 to seat on the swinging base, the screws 34 and 41 tightened, and the screws 45 adjusted to allow sliding motion only of bracket 39. The position of the swinging base may then be finely adjusted by means of screw 44, and the screws 45 tightened.

Referring to FIG. 5, the drive for cutter spindle 4 is from a motor 61, shown also in FIG. 1, through pulley 62, belt 63 and pulley 64, shaft 65, bevel reduction gears 66, shaft 67, fine tooth clutch 68, pinion 69, and gear 71 on the screws 45 adjusted to allow sliding motion only of housing 2; the pinion 69 is wide enough to accommodate axial motion of the spindle 4 and gear 71. This axial motion is effected primarily by a cam 72 through mechanism shown in greater detail in FIG. 3. In the case of a gear finishing operation, the axial motion may be modified by a cam 73 co-rotatable with cam 72.

For rough cutting gears G, the spindle 4 is reciprocated once while it makes several revolutions. The drive of the cam 72 used for roughing is from shaft 67 through change gears 74, shaft 75, worm 76, worm wheel 77, fine tooth clutch 78, and shaft 79 onto which the cam 72 is detachably keyed. The cam during each revolution effects one reciprocation of the cutter spindle and by substitution of change gears 74 of different ratios, the number of revolutions of the cutter per revolution of the cam may be varied. For finish cutting gears, the spindle 4 may make one or more reciprocations per revolution of the cutter. In a typical case wherein the cutter C is provided with alternate inside and outside cutting blades, as disclosed in Patent No. 2,994,943 to L. O. Carlsen et al., the cutter makes ten reciprocations per revolution and the finishing cam 72 is adapted to effect two such reciprocations during each of its revolutions. The cam drive is then from shaft 67 through change gears 81 (which are removed for roughing), shaft 82, bevel pinion 83, and bevel gear 84 on cam shaft 79. For finishing, the change gears 74 are removed and clutch 78 is disengaged. For both roughing and finishing, backlash is removed from the cam drive train by a brake 85 connected by shaft 86 to a bevel pinion 87 meshing with bevel gear 84.

Figure 8:
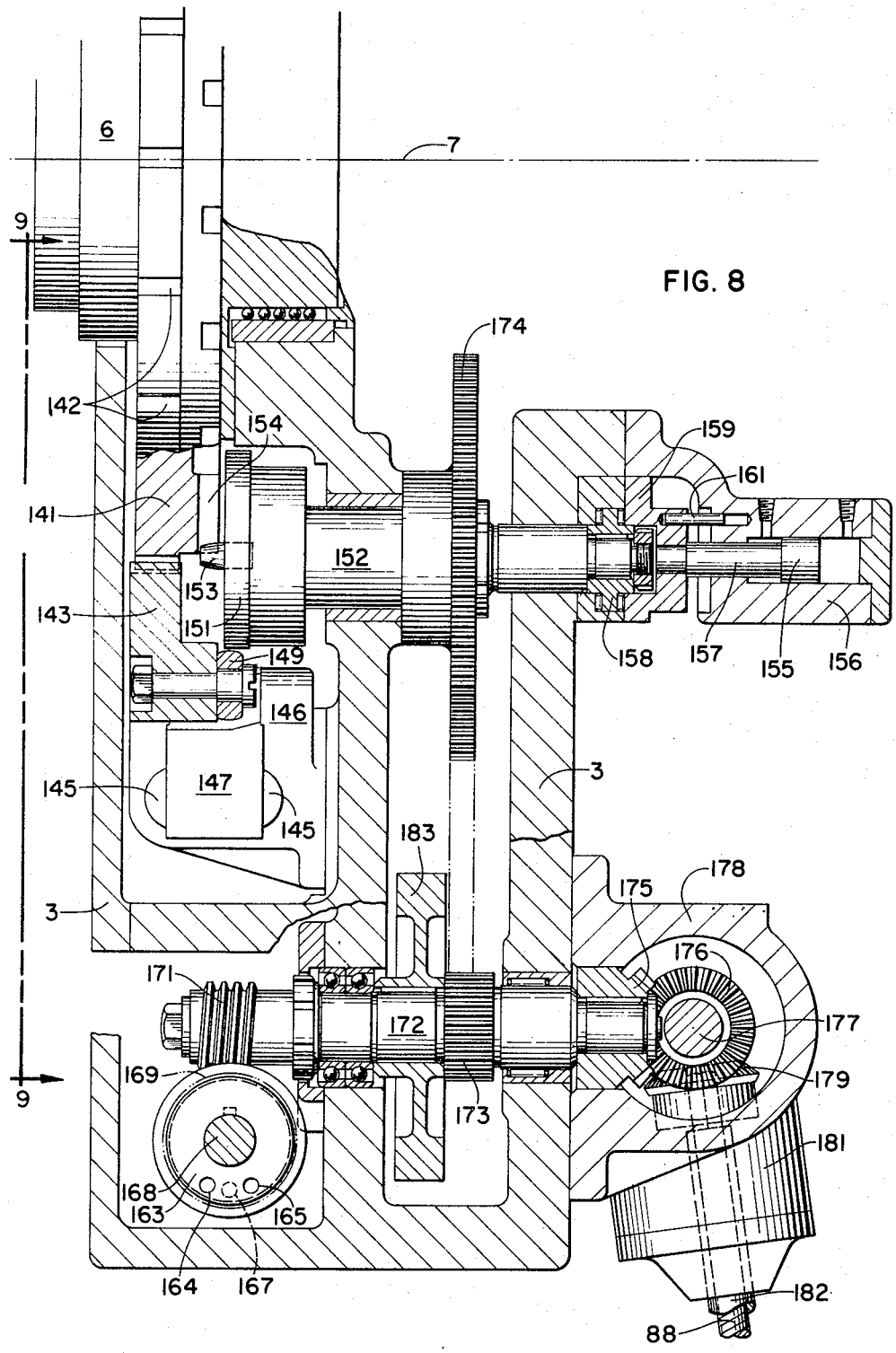
FIG. 8 is a sectional view in planes 8A—8A and 8B—8B of FIG. 9, showing indexing mechanism in the work head of the machine.

Indexing mechanism for work spindle 6 in work head 3, FIG. 8, is actuated by a flexible shaft 88 in a manner to be described later, the flexible shaft being driven from a shaft 89 through bevel gears 91, FIG. 5. For roughing the shaft 89 is driven by shaft 75 through bevel gears 92, whereas for finishing (in which case one or both of change gears 74 are removed) shaft 89 is driven by shaft 65 through gears 93 and 94, the latter of which is removed for roughing. Shafts 65, 67, 75, 79, 89 and the end of shaft 88 adjacent gears 91 are all journaled for rotation in housing 2.

Figure 3:
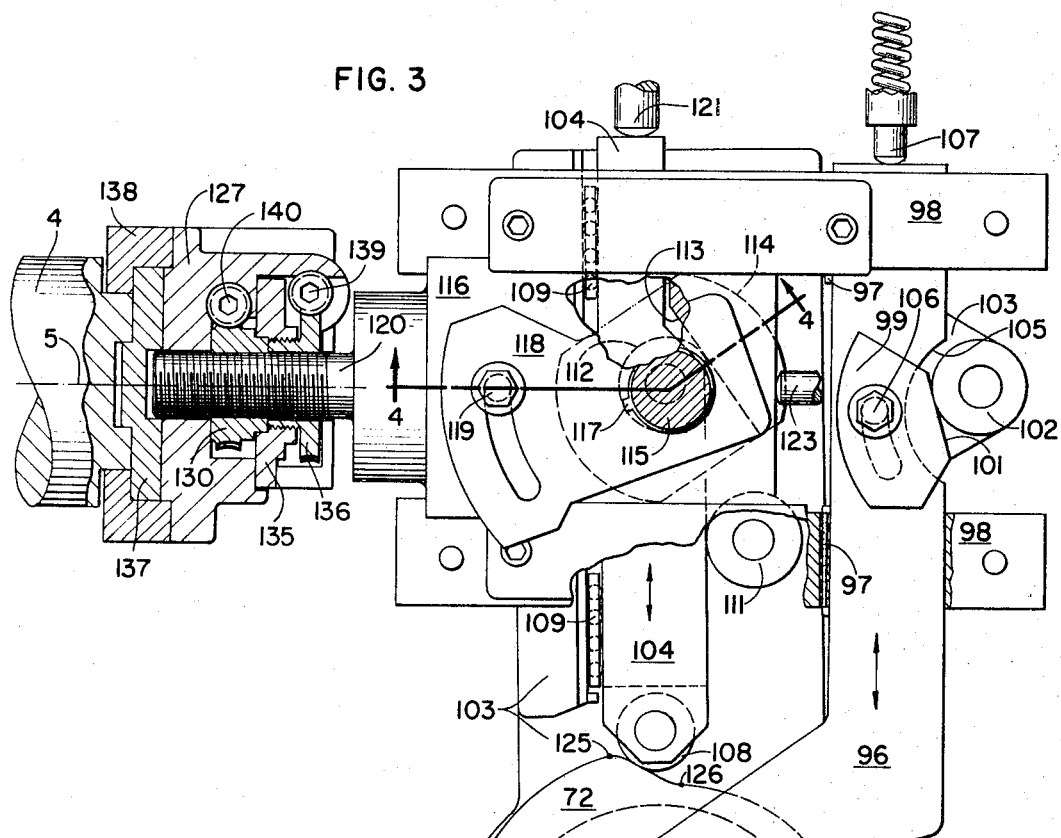
FIG. 3 is a plan view of mechanism for reciprocating the cutter spindle, with parts in section in planes 3—3 of FIG. 4.
Figure 4:
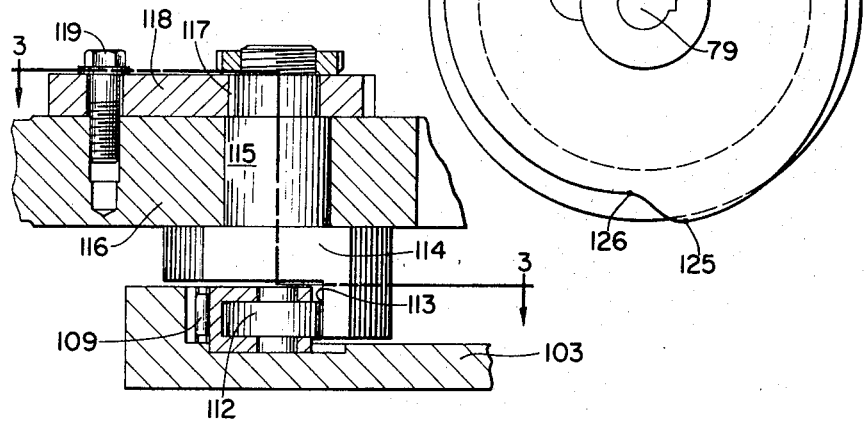
FIG. 4 is a detail sectional view in plane 4—4 of FIG. 3.

The mechanism in housing 2 for transmitting motion from cams 72 and 73 to the cutter spindle 4 is shown in FIGS. 3, 4 and 5. A follower roller 95 for cam 73 is carried by a horizontal follower slide 96 supported for reciprocation perpendicularly to spindle axis 5 on linear roller bearings 97 on guides 98 rigid with the housing. A cam shoe 99 secured to the slide 96 has a plane face 101 contacted by a roller 102 carried by a support 103 for another follower roller slide 104. Shoe 99 has a flange bearing on cylindrical surface 105 of follower slide 96 and is adjustable on this surface to vary the inclination of face 101 to the direction of slide motion. After such adjustment the shoe is secured to the slide by a screw 106 which extends through an arcuate slot in the slide. A spring-backed plunger 107 slidable in the housing 2 presses against the slide to maintain roller 95 against cam 73.

The support 103 for follower slide 104 is mounted in the housing 2 for rocking motion about shaft 79. The slide 104 caries a follower roller 108 for cam 72 and is movable on the support 103, substantially parallel to slide 96, on linear roller bearings 109 and a roller 111 carried by the support. A follower roller 112 on slide 104 bears on the plane face 113 of a cam shoe 114 having a shank 115 rotatably supported by a slide block 116, the latter being reciprocable on guides 98 in direction of spindle axis 5. Shank 115 is keyed at 117 to a plate 118 having an arcuate slot for a clamp screw 119, which, when loosened, enables adjustment of the shoe 114 to vary the inclination of face 113 relative to the direction of reciprocation of slide 104. An hydraulic plunger 121, slidable in a cylinder 122, FIG. 10, in housing 2, presses against the slide 104 to maintain roller 108 against cam 72. Similarly an hydraulic plunger 123, slidable in cylinder 124 in housing 2, presses slide block 116 to the left in FIG. 3, axially of the spindle 4, to maintain cam shoe 114 against roller 112, to press slide 104 through bearings 109 against support 103, to press roller 102 on support 103 against cam shoe 99, and to press slide 96, which carries shoe 99, against bearings 97 which bear upon guides 98.

Slide block 116 has a shank 120 screw threaded to the bore of a worm wheel 130 that is rotatable in a journal block 127. A plate 135 rigidly secured to the block 127 has screw threaded thereto the hub of another worm wheel 136 that is freely rotatable on shank 120. A journal disc 137 rigidly secured to the end of cutter spindle 4 is held in rotatable engagement with the journal block by a circular gib 138 secured to the block. By suitable means, not shown, a film of lubricant is maintained between disc 137 and the parts 127, 138 to provide for free rotation of the spindle while holding it against axial motion relative to the journal block 127. By rotation of worm wheel 136 in block 127 by means of a screw 139, the worm wheel 130 may be freed for rotation or may be tightly clamped to block 127 and shank 120. When freed it may be rotated relative to members 127 and 120 by means of a screw 140, to adjust the spindle 4 axially relative to slide block 116, to thereby compensate for variation in axial extent of the blades of cutter C caused by resharpening or the like.

During operation of the machine, the plunger 123 constantly urges the cutter spindle 4 axially, to the left in FIGS. 3 and 5, and to the right in FIGS. 1 and 2. Referring to FIG. 3, the cam 72 illustrated, which is for finishing, recedes radially from high points 125 counterclockwise to low points 126 and as the receding portions pass clockwise beneath the roller 108 the slide 104 and the roller 112 move downwardly (in FIG. 3) and thereby allow the inclined face 113 of shoe 114 to move to the left, causing the blade of the rotating cutter which is traversing the workpiece to move in a helical path to the left. As the following return portions of the cam, counterclockwise from points 126 to points 125, pass the roller 108 the latter is moved upwardly (in FIG. 3) so that the roller 112 acts on surface 113 to effect a return stroke of the spindle, to the right. This action occurs between the conclusion of cutting by one blade and the start of cutting by the next blade. In order to avoid excessive loads on the cams 72 and 114 and rollers 108 and 112 during such return strokes, valve means are provided to reduce the hydraulic pressure on plungers 121 and 123.

These valve means, FIG. 10, comprise a spool valve 128 slidable in a valve body 129 on housing 2, the stem of the valve having a follower roller 131 for a cam 132 on shaft 86, FIG. 5. Pressure from line 27 is applied through ports 133 and 134 to cylinders 122, 124, except when the return portions 126–125 of the cam 72 are effective. At these times the lobe of cam 132 moves valve 128 to the right in FIG. 10 to disconnect port 134 from port 133 and connect it with a port 135 which leads through a pressure relief valve to exhaust line 28. This relief valve is adjusted to maintain a relatively low pressure in cylinders 122 and 124.

For the roughing operation, where the return stroke of the spindle 4 is relatively much slower than during finishing, the relief valve is preferably disabled, so that pressure from line 27 is constantly applied to cylinders 122, 124. For either roughing or finishing, the axial stroke of the cutter spindle effected by cam 72 may be adjusted by changing the inclination of cam face 113 relative to the direction of reciprocation of slide 104. To facilitate such adjustment, suitable graduations, not shown, are preferably provided on plate 118 and on the adjacent surface of slide block 116. For finish cutting without axial motion of the cutter the cam face 113 may be adjusted into parallelism with the slide 104, or the cam 72 may be replaced with a circular disc.

Preferably the feed portions from points 125 counter-clockwise to points 126 of cam 72 are so shaped that the motion of slide 104 effected thereby is constant relative to cam rotation. However, helicoidal tooth surfaces of varying axial lead may be produced, according to the method of Patent No. 3,110,225 to L. O. Carlsen et al., by additional motion introduced by cam 73. Upon reciprocation of slide 96 by cam 73 the cam shoe 99 acts against roller 102 to rock the assembly comprising support 103 and slide 104 about the axis of shaft 79 and thereby adds to and subtracts from the motion imparted to the cutter spindle by cam 72 acting through slide 104, roller 112 and cam shoe 114. The magnitude of such additional motion, as applied to the cutter spindle, may be varied by adjusting the inclination of cam face 101 to the slide 96, and for this purpose suitable graduations, not shown, are preferably provided on contiguous surfaces of slide 96 and shoe 99. The cam 73 obviously may be formed to produce any of various modifications of the motion effected by cam 72. However, the usual modification is one in which each blade of the cutter cuts slightly deeper at the ends of the teeth than it would if the axial motion of the cutter were constant. The modification thereby produces teeth which have a slight amount of lengthwise ease-off or end relief. For rough cutting this is usually not necessary and hence for roughing the face 101 may be adjusted into parallelism with slide 96, or the cam 73 may be replaced with a circular disc..

Referring to FIGS. 8 and 9, the indexing mechanism for work spindle 6 in work head 3 comprises an index plate 141 detachably secured to the spindle. The plate has around its periphery a series of equally spaced notches 142 corresponding in number to the tooth slots to be cut in the work gear G. The notches are adapted to engage a pawl 143 which is pivoted to work head 3 by a pin 144 and is urged into engagement with the notched plate by a pair of spring-backed plungers 145. These plungers are slidable in a bracket 146 secured to work head 3 and they act against the pawl 143 through the intermediacy of a lever 147 which is fulcrummed to the bracket by a pin 148. A roller 149 on the pawl follows a pawl-actuating cam 151 that is detachably secured to a shaft 152 journaled in the work head 3 for rotation and axial motion. Referring to FIG. 9, the low portion of cam 151 is of such radius as to slightly clear roller 149 when the pawl 143 is fully engaged in a notch 142. A Geneva drive pin 153 on the cam is engageable successively in equally spaced radial slots 154 in the plate 141, the number of such slots equalling the number of notches 142.

Axial motion of shaft 152 to move pin 153 into and out of the plane of rotation of slots 154, and to move the cam 151 into and out of engageable relation with roller 149, is effected by a piston 155 reciprocable in a hydraulic cylinder 156 secured to work head 3. The piston rod, 157, is connected to shaft 152 by a roller bearing 158 whose outer race member, 159, is held against rotation by a guide pin 161 which is slidable in cylinder 156. Hydraulic pressure from line 27, FIG. 10, is constantly applied to cylinder 156 against the small area inner end of piston 155, to urge it to the right in FIGS. 8 and 10. The opposite end of the cylinder is connected either to pressure from line 27 or to exhaust line 28 by a rotary valve, comprising a valve casing, secured to work head 3, having side plates 163 with aligned ports 164 and 165. The rotary valve further comprises a rotor 166, between plates 163, having a single port 167 which in one position of the rotor is aligned with the ports 164 to connect the outer end of cylinder 156 to pressure line 27, and in another position is aligned with the ports 165 to connect the outer end of the cylinder to exhaust line 28. When the connection is to line 27 the piston 155 and shaft 152 are moved to the left, and when it is to line 28 they are moved to the right.

The valve rotor 166 is secured to a shaft 168 which bears a worm wheel 169 meshing with a worm 171 on a shaft 172 rotatable in the work head 3. This shaft has thereon a pinion 173 meshing a gear 174 on shaft 152, the pinion being wide enough to mesh with the gear in any position of axial motion of shaft 152. A bevel gear 175 on shaft 172 meshes with a bevel gear 176 keyed on a shaft 177 rotatable in a bracket 178 rigid with housing 3. Another bevel gear on shaft 177 meshes with a gear 179 mounted for rotation in a part 181 which is pivoted to bracket 178 for rotation thereon about the axis of shaft 177. Gear 179 is connected to the flexible shaft 88 which is rotatable in a flexible sheath 182 joined to part 181. It has been mentioned previously that shaft 88 is driven from shaft 89 by bevel gears 91, FIG. 5. As shown in FIG. 1, shaft 177 is parallel to and near axis 18, so that most of the displacement of the index drive required by advance and withdrawal motion of the swinging base 15 is accommodated by swiveling of part 181 about the shaft 177. The remainder is accommodated by the flexibility of shaft 88 and its sheath 182. A fly wheel 183 on shaft 172 is provided to equalize the varying torque load applied to the flexible shaft by the Geneva drive 153, 154.

The gearing of the machine is such that when the machine is set up for roughing (gears 74 installed) the valve rotor 166 makes one turn for each turn of cam 72, and, in a typical machine, the index shaft 152 makes nine turns for each turn of cam 72. When the machine is set up for finishing (gear 94 and gears 81 installed), the valve rotor makes one turn for each turn of cutter spindle 4, and, in the same typical machine, the index shaft makes nine turns for each turn of the cutter spindle. The timing is such when roughing that valve ports 164 and 167 are aligned to move the index shaft 152 to the left only (a) after cam 72 has withdrawn the cutter spindle 4 to the right in FIG. 5 so that the cutter is clear of the work gear, and (b) at an instant when the Geneva drive pin is in the portion of its revolution clear of the index plate 141. At this time the low portion of index cam 151 is beneath the pawl-carried roller 149. With the rotating shaft 152 now in its left position, the lobe of cam 151 lifts the pawl 143 from the notch 142 in which it has been engaged; the Geneva pin 153 engages in a radial slot 154, angularly advances the index plate and spindle 6 by one index pitch and then departs from the slot; and the cam 151 then allows re-engagement of the pawl with the index plate. Immediately after such indexing action the valve ports 165 and 167 are aligned, causing the piston 155 to move shaft 152 to the right where it remains until the next indexing cycle is commenced, after another turn of cam 72 and valve rotor 166. In finish cutting operation the indexing action is the same except that it occurs at the conclusion of each turn of the cutter spindle, each time a gap between the last and first blades of the cutter comes abreast of the work gear G. The afore-described timing between the cam 72 used for roughing and the index mechanism is readily obtained by opening clutch 78, rotating the cam as required, and then reclosing the clutch. Similarly the timing between the cam 72 used for finishing and the cutter spindle is effected by rotating the spindle while clutch 68 is open. For finishing, the index mechanism may be timed to the cutter by turning shaft 89 with gear 94 removed.

Summarizing operation of the machine: In roughing, a gear blank is loaded on work holder 8 while the swinging base 15 is withdrawn to the position thereof in which the work spindle axis 7 is upright. By operation of manual valve 26 the swinging base is advanced to cause brace sections 31 and 37 to abut, and clamp 49 is then applied by means of handle 52. The motor 61 is then started (by switch means, not shown) causing the machine to operate through a cycle wherein the cam 72 feeds the rotating cutter axially into the gear blank to cut one tooth slot and then withdraws the cutter, and the indexing mechanism then advances the work gear by one index pitch to bring the next tooth space into cutting position. This cutting-indexing cycle repeats automatically for each tooth slot of the gear, and, after the indexing operation following the cutting of the last slot, an automatic counter operated switch, not shown, stops the motor. The clamp 49 is then released and by operation of valve 26 the swinging base is withdrawn to bring the work spindle to upright position for removal of the work gear. In gear finishing, the operation is essentially the same except that during the cutting-indexing cycle the cutter spindle 4 may reciprocate several times (ten times in the example given) during each turn of the cutter, and the tooth-to-tooth indexing of the work occurs at the end of each revolution of the cutter, while a gap in the cutter is abreast of the work.

Having now described the machine in its preferred form, and its operation, what I claim as my invention is:

1. A gear cutting machine comprising a cutter spindle and a housing supporting said spindle for rotation and axial reciprocation, first and second cams co-rotatable in the housing and geared to the spindle for rotation in constant velocity ratio therewith, and means actuated by said cams for effecting axial reciprocation of the spindle, said means being arranged to combine the reciprocating motion effected by one cam with that effected by the other cam.

2. A machine according to claim 1 in which said means include mechanisms for independently adjusting the magnitude of the reciprocating motion effected by each cam.

3. A gear cutting machine comprising a cutter spindle and a housing supporting said spindle for rotation and axial reciprocation, first and second cams supported for rotation in the housing, a first slide and a member supporting the same in the housing for reciprocation by the first cam in a direction substantially at right angles to the axis of the spindle, a guide and guide follower carried by the slide and the spindle for transmitting reciprocating motion therebetween, the guide being angularly adjustable to vary the magnitude of the transmitted motion, a second slide supported by the housing for reciprocation by the second cam in a direction substantially at right angle to the axis of the spindle, a guide and a guide follower carried by said supporting member and the second slide for transmitting reciprocating motion therebetween, said supporting member being supported in the housing for motion substantially in the direction of the spindle rotation axis.

4. A machine according to claim 3 in which said cams are geared to said spindle for rotation in time therewith.

5. A machine according to claim 3 having pressure means for urging said cutter spindle axially forwardly, toward the work, and said cams being arranged to control such forward axial motion of the spindle and to effect its return axial motion against the resistance of said pressure means.

6. A machine according to claim 3 having means for pressing the cutter spindle axially forwardly, toward the work, and for pressing said slides toward said cams, said pressure means for the cutter spindle and one of said slides being actuated by hydraulic pressure, and valve means operable in time with said cams for relieving said hydraulic pressure during return axial motion of the cutter spindle, away from the work.

7. A machine according to claim 3 in which said cams are co-rotatable.

8. A machine according to claim 7 in which the support of said supporting member in the housing is for angular motion about the axis of rotation of the cams.

9. A gear cutting machine comprising a cutter spindle and a housing supporting it for rotation and axial reciprocation, a work spindle and a work head supporting it for rotation, first and second cams co-rotatable in said housing and geared to the cutter spindle for rotation in constant velocity ratio therewith, means actuated by said cams for effecting axial reciprocation of the spindle, said means being arranged to combine the reciprocating motion effected by one cam with that effected by the other cam, an indexing mechanism in said work head for effecting intermittent rotational advance of the work spindle, and a drive connection between said cams and said mechanism for causing one indexing action of the latter upon each reciprocation of the cutter spindle.

10. A machine according to claim 9 having a frame upon which said housing and spindle are independently adjustable, said indexing mechanism includes a rotatable input shaft in the work head, and said drive connection includes a flexible rotary shaft drive between the housing and work head for transmitting rotary motion to said input shaft.

11. A machine according to claim 10 in which there is a fly wheel on said rotatable input shaft.

12. A machine according to claim 11 in which said index mechanism includes a rotatable Geneva drive member, reduction gearing connecting said member to said rotatable input shaft for rotation at lower speed than said input shaft, a Geneva driven wheel on said work spindle, and means for reciprocating said drive member axially into and out of engagement with said driven wheel.

13. A gear cutting machine comprising a cutter spindle and a housing supporting it for rotation, rotatable drive means for the cutter spindle in said housing, a work spindle and a work head supporting it for rotation, a frame supporting said housing and work head for relative adjustment thereon to accommodate work gears of different designs; a mechanism in the work head for intermittently rotating the work spindle, said mechanism including a rotatable input shaft having a flywheel thereon, a rotatable Geneva drive member, reduction gearing connecting said drive member to said rotatable input shaft for rotation at lower speed than said input shaft, and a Geneva driven member on said work spindle adapted for intermittent drive engagement by said drive member; and means including a flexible rotary drive shaft connecting said input shaft to said rotatable drive means for rotation in unison therewith.

References Cited

UNITED STATES PATENTS

| 844,729 | 2/1907 | Jordan | 90—9 |
|---|---|---|---|
| 1,283,693 | 11/1918 | Derr | 90—9 |

GERALD A. DOST, *Primary Examiner.*

UNITED STATES PATENT OFFICE
CERTIFICATE OF CORRECTION

Patent No. 3,354,783                         November 28, 1967

Norman W. Fowler

It is hereby certified that error appears in the above numbered patent requiring correction and that the said Letters Patent should read as corrected below.

Column 3, line 26, for "screws 45 adjusted to allow sliding motion only of" read -- spindle. The shafts are journaled for rotation only in --.

Signed and sealed this 17th day of December 1968.

(SEAL)

Attest:

Edward M. Fletcher, Jr.

Attesting Officer

EDWARD J. BRENNER

Commissioner of Patents